Nov. 4, 1924.

D. R. SCHOLES

WINDMILL

Filed Dec. 1 1921

1,514,305

3 Sheets-Sheet 1

Inventor:
Daniel R. Scholes
By G. L. Cragg
Atty.

Nov. 4, 1924.　　　　　　　　　　　　　　　　1,514,305
D. R. SCHOLES
WINDMILL
Filed Dec. 1 1921　　3 Sheets-Sheet 2
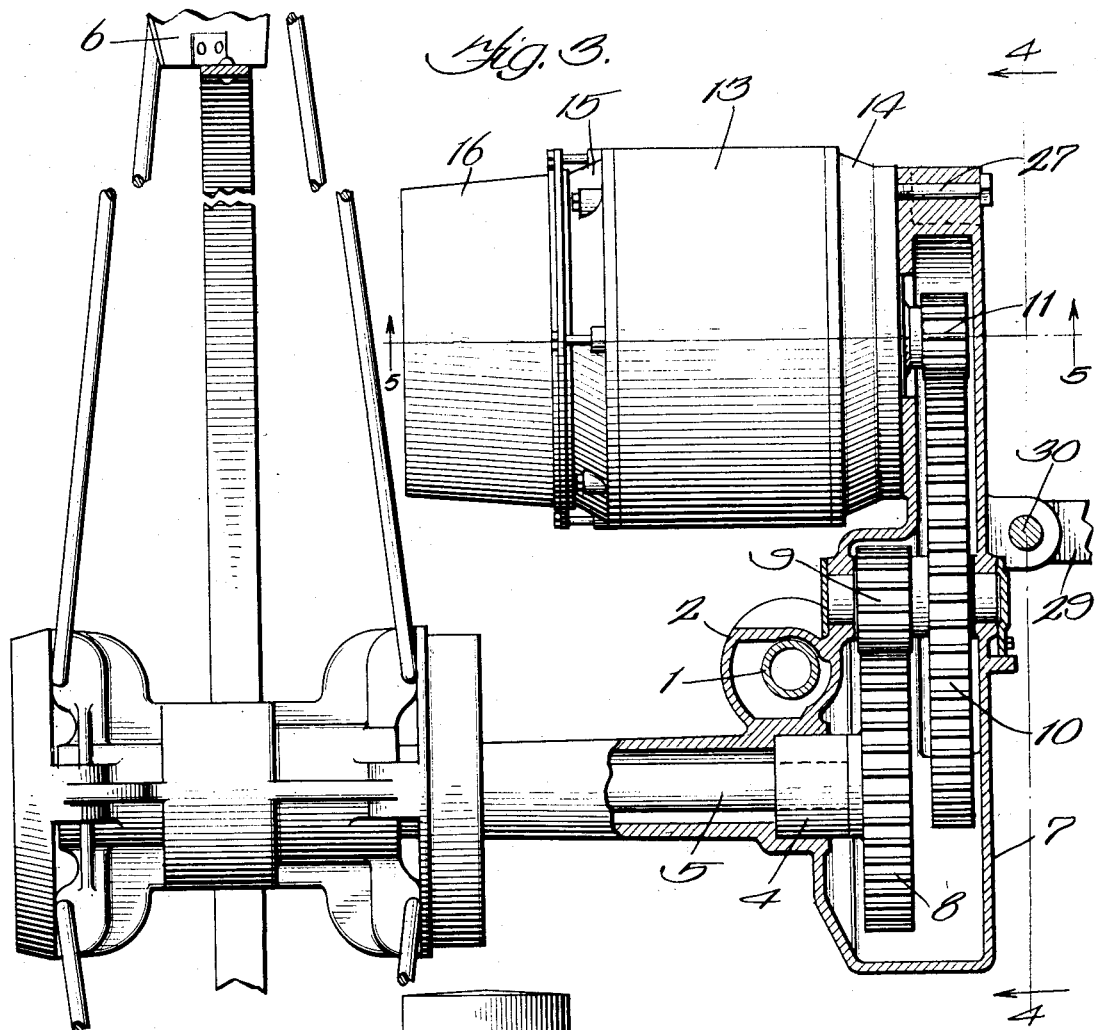
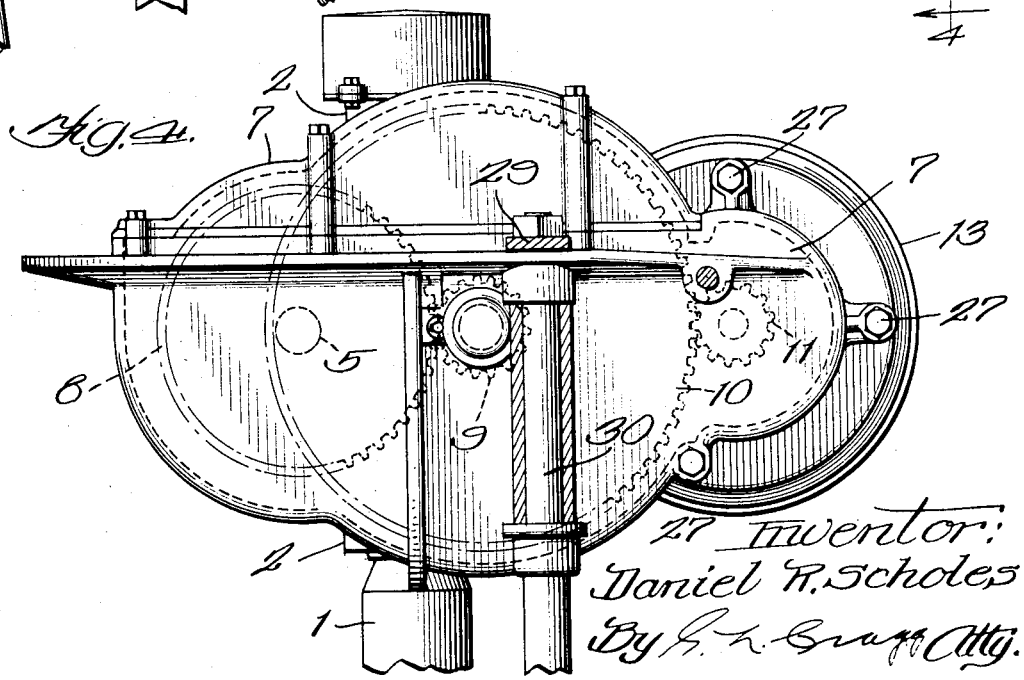

Nov. 4, 1924.
D. R. SCHOLES
WINDMILL
Filed Dec. 1 1921
1,514,305
3 Sheets-Sheet 3
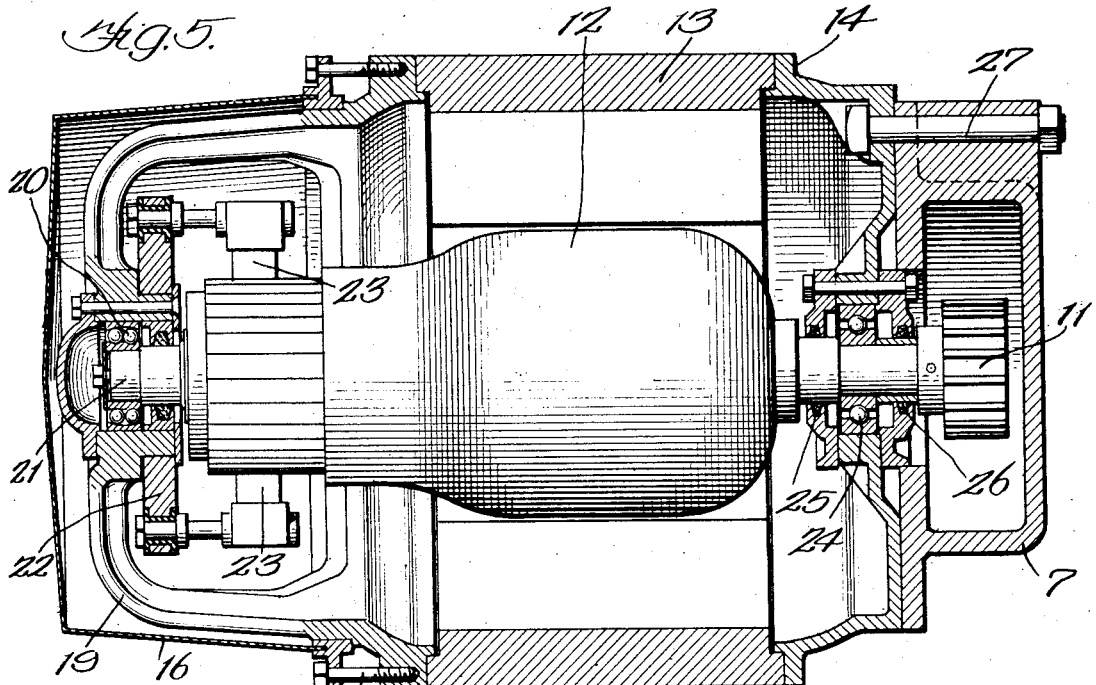
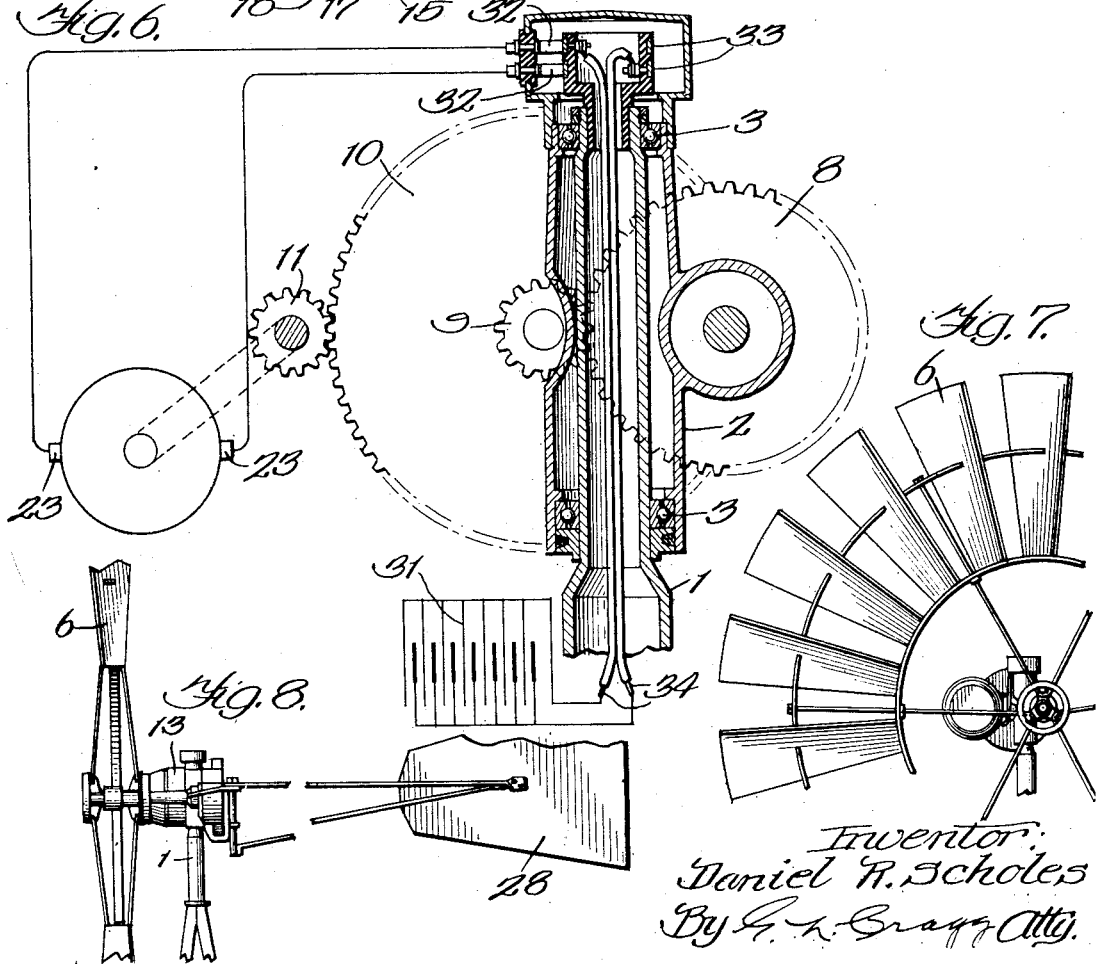
Inventor:
Daniel R. Scholes
By G. L. Bragg Atty.

Patented Nov. 4, 1924.

1,514,305

UNITED STATES PATENT OFFICE.

DANIEL R. SCHOLES, OF CHICAGO, ILLINOIS, ASSIGNOR TO AERMOTOR COMPANY, OF CHICAGO, ILLINOIS, A CORPORATION OF ILLINOIS.

WINDMILL.

Application filed December 1, 1921. Serial No. 519,150.

*To all whom it may concern:*

Be it known that I, DANIEL R. SCHOLES, citizen of the United States, residing at Chicago, in the county of Cook and State of Illinois, have invented a certain new and useful Improvement in Windmills, of which the following is a full, clear, concise, and exact description.

My invention relates to windmills and has for its object the provision of apparatus whereby windmills may be effective in generating electric current with which storage batteries may be charged or which may be otherwise employed.

In carrying out my invention I employ a generator that is in the form of a dynamo electric machine and located upon one side of the wind wheel axis so as to be subjected as much as possible to the cooling effect of the air that finds forcible passage through the central portion of the wheel. The mill head, which has a vertical axis of rotation, supports the wind wheel in any usual or preferred way and carries a mounting for the gearing that connects the wind wheel with the armature or rotor of the generator. The gear mounting is preferably in the form of a closed gear casing and the generator is also closed whereby these parts of the apparatus are protected from the weather. Lubricant may be contained in the gear casing to keep the bearings of the gears constantly lubricated. The mill vane of the wind mill may also be mounted upon the gear casing. In order that the windmill structure of my invention may be well balanced to reduce as much as possible the effect of inertia in order that the mill may sensitively respond to the fluctuations of the wind, the vertical axis of rotation of the mill is located between the horizontal wheel axis and the generator and said vertical axis of rotation of the mill head is interposed between the gear casing and the mill vane on one side and the wheel on the other.

Figure 1:
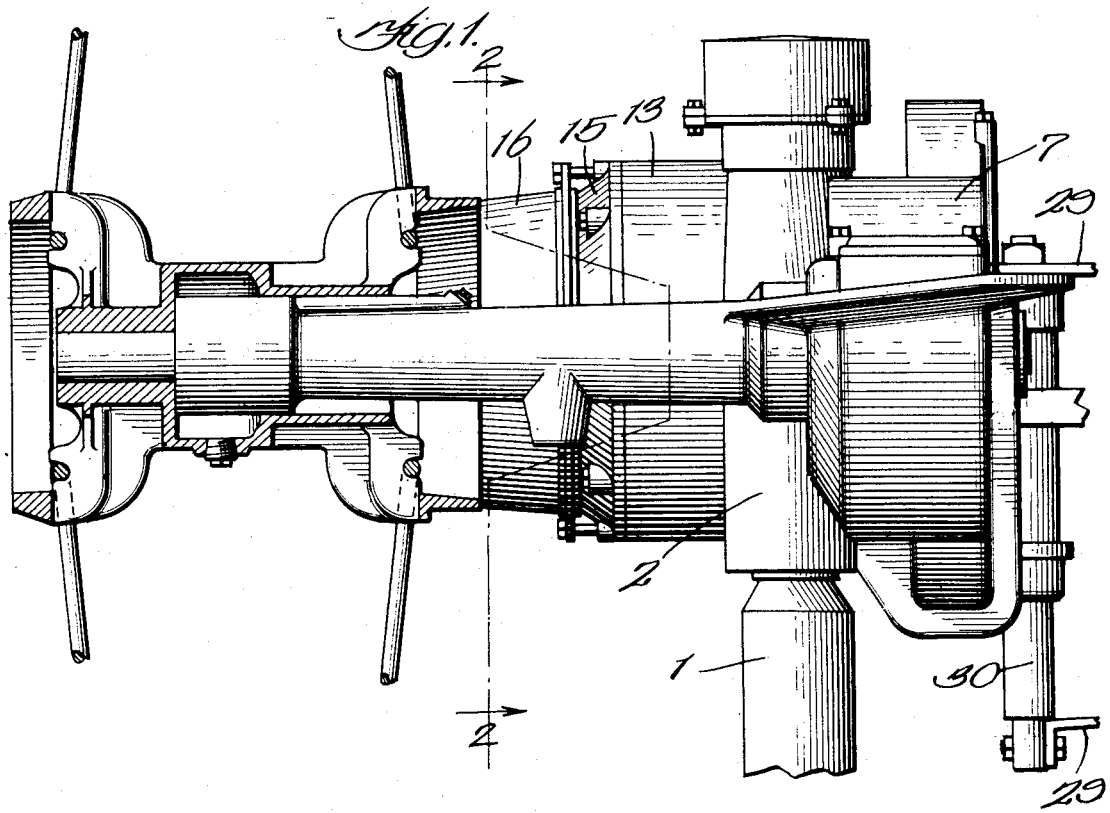
Figure 2:
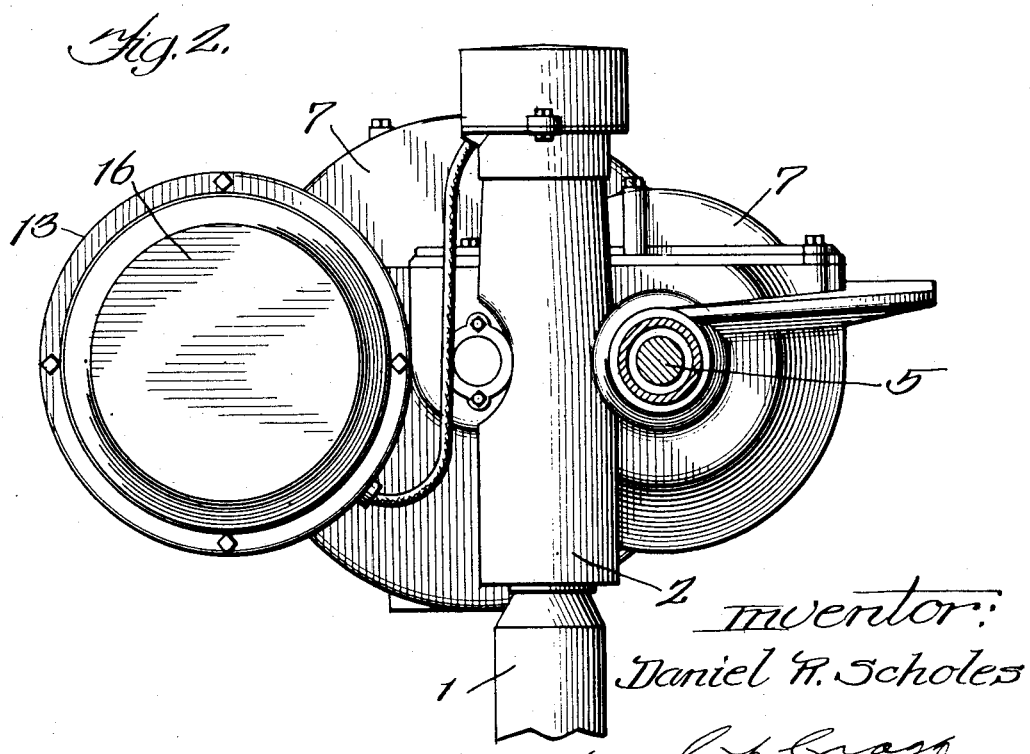

The invention will be fully described in connection with the accompanying drawings showing the preferred embodiment thereof and in which Fig. 1 is a view in elevation, partially in section, of a portion of the windmill structure; Fig. 2 is a view on line 2—2 of Fig. 1; Fig. 3 is a plan view with parts in section and parts broken away; Fig. 4 is a view on line 4—4 of Fig. 3; Fig. 5 is a sectional view of the generator and the adjacent portion of the gearing on line 5—5 of Fig. 3; Fig. 6 is a vertical sectional view of a part of the upper portion of the windmill structure, the gearing being somewhat diagrammatically illustrated in its relation to the generator and the circuit relation of the generator being also indicated; Fig. 7 is a front view illustrating a portion of the wind wheel and mechanism behind it; and Fig. 8 is a side view of the wind mill structure for the purpose of indicating the relation of the mill vane to the balance of the structure.

Like parts are indicated by similar characters of reference throughout the different figures.

The windmill illustrated includes an upright tubular column 1 that has a reduced upper end passing through the mill head 2, this mill head being supported by ball bearings 3 that are interposed between the tubular column and the mill head. In this way the mill head is given a vertical axis of rotation. Horizontal bearings 4 are carried upon the mill head and serve to support the horizontal shaft 5 of the wind wheel 6, this wheel being of any usual or suitable construction. The mill head has an enlargement 7 thereon that constitutes a gear casing or mounting that houses a number of gear wheel 8, 9, 10 and 11 that are included in a speed increasing gear train. The spur gear wheel 8 is fixed upon and co-axial with the wheel shaft 5 and is in mesh with a spur pinion 9 that is fixed upon and co-axial with the spur gear wheel 10. The spur pinion 11 is in mesh with the spur gear wheel 10 and is fixed upon and co-axial with the armature or other rotor 12 of the generator that is in the form of a dynamo electric machine. This armature is thus driven at a high rate of speed with respect to the speed of the wind wheel proper to generate current that the windmill is designed to furnish. This generator has an annular field element 13 having insetting poles that are distributed about the armature in accordance with common practice. This field element 13 forms a portion of an enclosure for the dynamo, this enclosure being made complete by means of a cap 14 assembled with the field at one end of the dynamo, a mounting ring 15 at the other end of the dynamo and a cap or bonnet 16 assembled with this mounting ring by means of bolts 17 that pass through the rim 18 upon and at the base of the cap 16. The mounting ring 15 supports a yoke 19 which carries a ball bearing structure 20 for one end of the armature shaft 21. This yoke also rotatively supports a mounting ring 22 for the commutator brushes 23 that bear upon the commutator of the generator which is preferably designed to produce direct current, especially if the generator is to serve to charge storage batteries.

The pinion 11, in the casing 7, is thus upon the exterior of the cap 14. This gear casing, being closed from the external atmosphere, not only protects the gear train therein from the weather but also protects the opening in the cap 14 through which the armature shaft projects into the gear casing to have the pinion 11 mounted upon said shaft.

The vertical axis of rotation of the mill head is not only between the generator and the horizontal axis of the wind wheel, but is also located between the wind wheel and the gear casing together with the gearing located therein. The mill vane 28 is also supported upon the gear casing which is between the mill vane and the wind wheel. This mill vane is carried upon the mill vane framework 29 that has a pivot shaft 30 located preferably upon the mill vane side of the gear casing 7.

By placing the vertical axis of rotation of the mill head between the generator and the horizontal axis of the wind wheel and disposing the mill vane, the gear train, and the casing for the gear train so that the axis of the mill head will be between these elements on one side and the mill wheel on the other and by locating the generator between the mill vane and the wind wheel and upon the wind wheel side of the gear casing 7, the weight of these elements of the mill are so equally distributed about the vertical axis of rotation of the mill head that the responsiveness of the wind mill to the fluctuations in direction and pressure of the wind is not materially reduced by the addition of the generator and the gearing for operating it. By locating the generator upon the wind wheel side of the casing and upon one side of the wind wheel axis, the generator is kept cool by the wind whose cooling effect is especially effective in this region.

If the generator produces direct current, as is preferably the case, it may be included in circuit with a storage battery 31 or other load by means of the collector ring brushes 32 that are carried upon the mill head and bear upon the stationary collector rings 33 that constitute terminals of the load circuit, being connected with the load by means of the circuit wires 34.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A windmill including a mill head; a mounting for the mill head defining a vertical axis of rotation therefor; a wind wheel mounted upon the mill head to have a horizontal axis of rotation; a mill vane upon the mill head, the axis of rotation of the mill head being between the mill vane and the wind wheel; a generator, in the form of a dynamo electric machine, mounted upon the mill head and disposed between the mill vane and the wind wheel, the axis of the mill head being between the axis of the wind wheel and the generator; and power transmission gearing coupling the rotor of the generator with the wheel and disposed upon the same side of the axis of the mill head with the vane.

2. A windmill including a mill head; a mounting for the mill head defining a vertical axis of rotation therefor; a wind wheel having a horizontal shaft journaled upon the mill head; a mill vane upon the mill head, the axis of rotation of the mill head being between the mill vane and the wind wheel; a generator, in the form of a dynamo electric machine, mounted upon the mill head and disposed between the mill vane and the wind wheel, the axis of the mill head being between the axis of the wheel and the generator; and power transmission gearing coupling the rotor of the generator with the wheel shaft and disposed upon the same side of the axis of the mill head with the vane.

In witness whereof, I hereunto subscribe my name this 18th day of November A. D., 1921.

DANIEL R. SCHOLES.